June 1, 1948.  H. N. EKLUND  2,442,347
SOUND AND VIBRATION DAMPING STRUCTURE
Filed Aug. 26, 1944  2 Sheets-Sheet 1
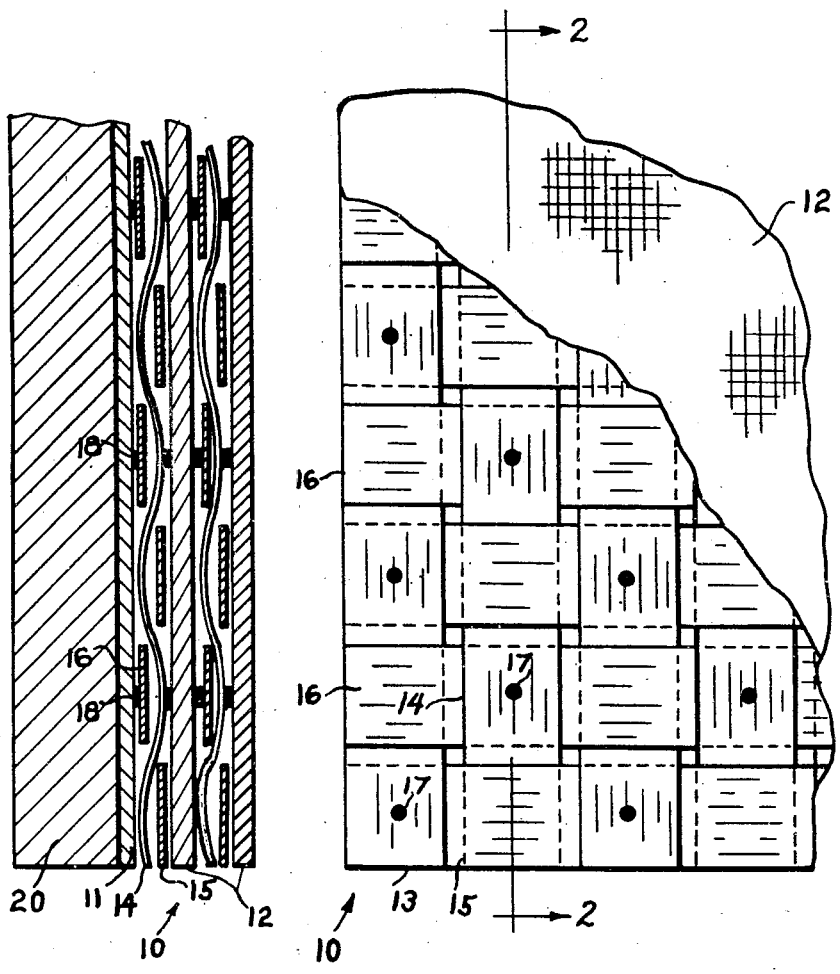
INVENTOR
HARRY N. EKLUND
BY
ATTORNEY June 1, 1948.                H. N. EKLUND                2,442,347
              SOUND AND VIBRATION DAMPING STRUCTURE
Filed Aug. 26, 1944                              2 Sheets-Sheet 2

Inventor
HARRY N. EKLUND
By D.E. Snyder
Attorney

Patented June 1, 1948

2,442,347

UNITED STATES PATENT OFFICE 2,442,347

SOUND AND VIBRATION DAMPING STRUCTURE

Harry N. Eklund, New York, N. Y.

Application August 26, 1944, Serial No. 551,412

8 Claims. (Cl. 154—44)

(Granted under the act of March 3, 1883, as amended April 30, 1928; 370 O. G. 757)

This invention relates to a sound and vibration damping structure and has for an object to provide an improved acoustical and sound and vibration damping panel or area that will more thoroughly reduce the transmission of sound and vibration than hitherto possible.

A further object of this invention is to provide an acoustical and sound and vibration damping material which is inexpensive both from the standpoint of the material and of the cost of assembling the material thus making a low price, yet easily available acoustical material.

Still a further object of this invention is to provide a sound and vibration damping material consisting principally of a layer of interwoven strips extending at angles to each other, the series of strips running in one direction being suitably secured to an adjacent piece of sheet material, the sheet material forming one face of the panel, and the strips of material running in the other direction being similarly secured to another piece of sheet material forming an opposite face of the panel.

A further object of this invention is to provide a sound and vibration damping material composed of a basket-type weave of flat strips of suitable material and suitably secured between sheets of facing.

Still a further object of this invention is to provide a sound and vibration damping material in which a unit is made up of interwoven strips between two sheets of facing sheet material but which may be made of any desired number of units secured face to face, in which case only a single intermediate sheet material face need be provided between adjacent interwoven sections.

Still a further object of this invention is to provide a sound and vibration damping material in which a unit is made up of interwoven strips between two sheets of facing sheet material with one set of the interwoven strips attached to the face of one sheet of material and the other set of interwoven strips attached to the face of the other sheet of material and wherein the interwoven strips of each set are free from fixed contact with the strips of the other set, but are in frictional contact with each other and of such a given coefficient of friction and tightness of weave that they will neither lock together nor move too freely over each other, so that sound and vibration will frictionally dissipate in passing from one facing sheet material to the other facing sheet material via the interwoven strips.

Reference is to be had to the accompanying drawings, forming a part of this specification, wherein like reference characters indicate corresponding parts throughout the several views, in which:

Fig. 1 is a plan view, partly broken away, of a unit of this invention;

Fig. 2 is a sectional view on line 2—2 of Fig. 1 showing the unit applied to a wall surface;

Figure 4:
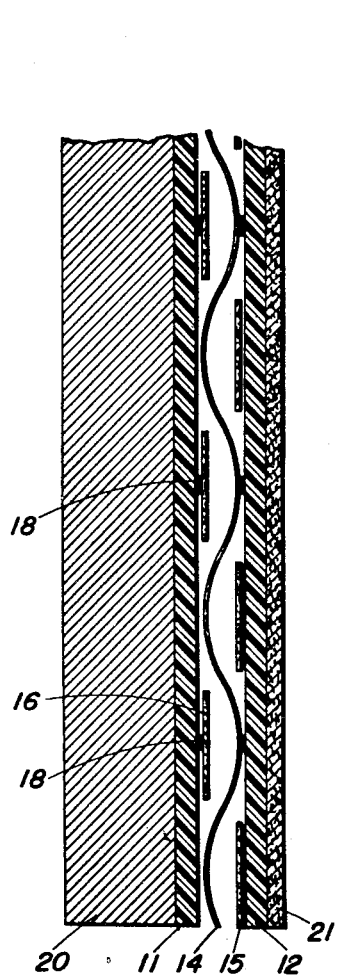
Fig. 4 is a sectional view on line 4—4 of Fig. 3 showing the unit applied to a wall surface.

There is shown at 10 an acoustical unit made up according to this invention. As shown in Fig. 2 this acoustical unit 10 is a double unit, but it will be understood that it may be made in single, triple or other multiple units if desired. A single unit includes an inner face sheet 11 and an outer face sheet 12 and a set of two series of interwoven strips 13 and 14 running in one direction and another set of two series of strips 15 and 16 running in a transverse direction, preferably at right angles to the direction of the set of strips 13 and 14. The strips 13 and 14 and 15 and 16 are of any suitable material such as metals, metal alloys, plastics or any other durable and flexible material capable of being produced in the form of flat strips while the face sheets 11 and 12 are of a non-perforated thin sheet material, more or less flexible, such as roofing paper, felt, linoleum, kraft paper or even thin sheet metal. In addition, the outer face sheet may be rather thick and porous, but have the inner side, to which the strips are fastened, impervious to airflow.

Figure 3:
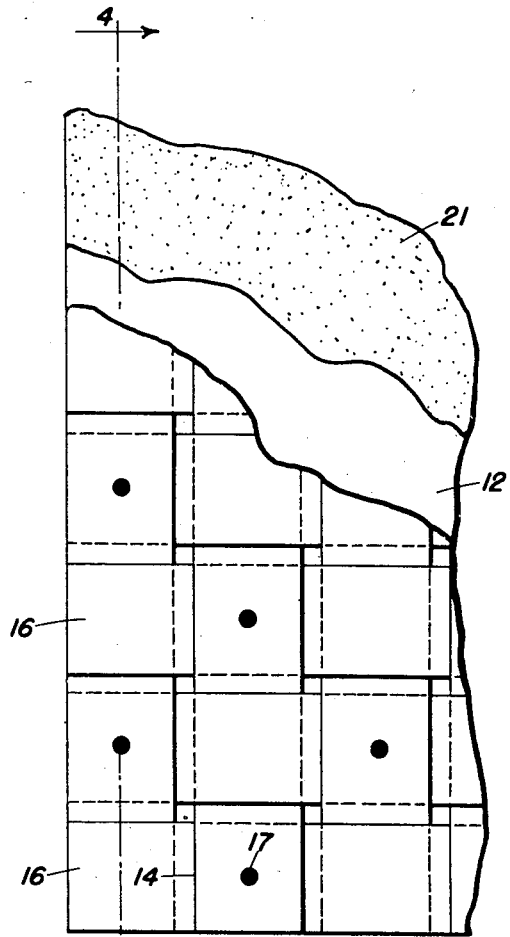
Fig. 3 is a plan view, partly broken away, of another embodiment of the invention.

Such a construction is illustrated in Figs. 3 and 4, showing an outer face sheet 12 with a thickened porous section 21 adapted to absorb sound and thereby reduce the noise level of the space faced by the structure of the applicant's invention.

The strips 13 and 14 are secured to the face sheet 12 in any suitable manner such as a spot of suitable cement 17 located in about the center of each portion of each strip where it passes close to the surface of the sheet 12. Similarly the strips 15 and 16 are each secured by similar spots of cement 18 or other suitable fastening means to the face sheet 11. Thus one set of strips extending in one direction are secured to only one face sheet and the other set of strips running transverse to the first set of strips are secured only to the other face sheet.

Obviously, if the face sheets are of thin metal and the interwoven strips are likewise of metal then suitable metal securing means might be substituted for the cement 17 and 18 such as spot welding, riveting and the like. Thus the interwoven sheets are free of any fixed contact with each other, but are in frictional contact with each other. The weave of the strips and the frictional surface on the strips must be such that they are not so tight as to lock together. However, they must likewise not be so loose as to permit motion without frictional dissipation of sound and vibration attempting to travel from one sheet to the other sheet via the interwoven strips. In general, according to the particular material of which the strips are made, a given coefficient of friction and tightness of weave will be required for optimum dissipation. If it is desired to build up the thickness of the acoustical unit, the face sheet 12 instead of being an outer facing would then be an intermediate facing to which one set of an additional interwoven unit of strips would be secured while the transverse set of strips would be similarly secured to another facing which in turn could either be the outer facing or an intermediate set or still another unit of interwoven strips. The acoustical device thus provided by this invention could be built up to any desired thickness thus enabling the material to provide sound absorption and vibration damping to any desired degree that might be necessary, the completed unit being suitably secured to any wall or ceiling surface 20.

From the above disclosure it will be understood that the feature resulting from the interwoven strips causes sound and vibration to be dissipated within the panel. Sound energy is transmitted through an otherwise air-tight wall or panel due to flexual vibrations of the wall caused by the impingement of sound waves on the outer surface of the wall. By covering the wall or panel with the sound and vibration damping material of this invention, the flexual vibration of the wall and with it sound transmission will be reduced due to dissipation of energy, which dissipation is caused by frictional resistance to the relative motion between the two sets of strips.

It will be understood that the above description and accompanying drawings comprehend only the general and preferred emobodiment of the invention and that various changes in details of construction, proportion and arrangement of parts may be made within the scope of the appended claims and without sacrificing any of the advantages of the invention.

The invention described herein may be manufactured and used by or for the Government of the United States of America for governmental purposes without the payment of any royalty thereon or therefor.

What is claimed is:

1. A fabricated sound and vibration damping panel comprising a plurality of face sheets and intermediate interwoven strips secured between said face sheets, the interwoven strips being in frictional but non-fixed contact with each other permitting one set of strips to move relative to the other set of strips to dissipate the energy of sound and vibration and diminish transmission thereof from one face sheet to the other face sheet.

2. A fabricated sound and vibration damping panel comprising a plurality of face sheets and an intermediate layer of interwoven strips secured between each pair of opposing faces of said face sheets, the interwoven strips being in frictional but non-fixed contact with each other permitting one set of strips to move relative to the other set of strips to dissipate the energy of sound and vibration and diminish transmission thereof from one face sheet to the other face sheet.

3. A fabricated sound and vibration damping panel comprising a pair of face sheets and an intermediate layer of interwoven strips secured between the opposing faces of said face sheets, the interwoven strips being in frictional but non-fixed contact with each other permitting one set of strips to move relative to the other set of strips to dissipate the energy of sound and vibration and diminish transmission thereof from one face sheet to the other face sheet.

4. A fabricated sound and vibration damping panel comprising a plurality of face sheets and an intermediate layer of interwoven strips secured between said face sheets, said layer of interwoven strips consisting of at least two sets of strips extending at angles to each other, one set of strips being secured to the adjacent surface of one face sheet and the transverse set of strips being secured to the adjacent surface of the other face sheet, the interwoven strips being in frictional but non-fixed contact with each other permitting one set of strips to move relative to the other set of strips to dissipate the energy of sound and vibration and diminish transmission thereof from one face sheet to the other face sheet.

5. A fabricated sound and vibration damping panel comprising a plurality of face sheets and at least one intermediate layer of interwoven strips secured between said face sheets, said layer interwoven strips consisting of at least two sets of strips extending at angles to each other, one set of strips being secured only to the adjacent surface of one face sheet and the transverse set of strips being secured only to the adjacent surface of the other face sheet.

6. A fabricated sound and vibration damping panel comprising a pair of face sheets and an intermediate layer of interwoven strips secured between the opposing faces of said face sheets, said interwoven strips consisting of two sets of strips extending at right angles to each other, one set of strips being secured only to the adjacent surface of one face sheet and the transverse series of strips being secured only to the adjacent face of the other face sheet.

7. A fabricated sound and vibration damping panel comprising a pair of face sheets and an intermediate layer of interwoven strips secured between the opposing faces of said face sheets, said interwoven strips consisting of two sets of strips extending at angles to each other, one set of strips being secured only to the adjacent surface of one face sheet and the transverse series of strips being secured only to the adjacent face of the other face sheet.

8. A fabricated acoustical and sound and vibration damping panel comprising a plurality of face sheets and at least one intermediate layer of interwoven strips secured between said face sheets, said layer of interwoven strips consisting of at least two sets of strips extending at angles to each other, one set of strips being secured only to the adjacent surface of one face sheet and the transverse set of strips being secured only to the adjacent surface of the other face sheet, one face sheet being impervious to air flow and the other face sheet on whose outer surface the sound and vibration impinges having an impervious inner surface and a porous outer surface of substantial thickness to dissipate sound energy through absorption.

HARRY N. EKLUND.

REFERENCES CITED

The following references are of record in the file of this patent:

UNITED STATES PATENTS

| Number | Name | Date |
|---|---|---|
| 1,265,841 | Walker | May 14, 1918 |
| 1,974,951 | Doorentz | Sept. 25, 1934 |
| 2,014,694 | Olschner | Sept. 17, 1935 |
| 2,106,457 | Hyman | Jan. 25, 1938 |
| 2,126,711 | Atwood | Aug. 16, 1938 |
| 2,373,738 | Atwood | Apr. 17, 1945 |

FOREIGN PATENTS

| Number | Country | Date |
|---|---|---|
| 236,000 | Great Britain | July 2, 1925 |